United States Patent
Turner et al.

(10) Patent No.: US 6,487,840 B1
(45) Date of Patent: Dec. 3, 2002

(54) COMBINED MULCHING AND SHREDDING BLADE

(75) Inventors: Darrel L. Turner, Reeseville, WI (US); Richard L. Wilkey, Hartland, WI (US)

(73) Assignee: Fisher Barton, Inc., Watertown, WI (US)

(*) Notice: Subject to any disclaimer, the term of this patent is extended or adjusted under 35 U.S.C. 154(b) by 0 days.

(21) Appl. No.: 09/907,987

(22) Filed: Jul. 18, 2001

Related U.S. Application Data

(60) Provisional application No. 60/219,483, filed on Jul. 20, 2000.

(51) Int. Cl.[7] ................................................ A01D 34/63
(52) U.S. Cl. ........................................................ 56/295
(58) Field of Search ................... 56/255, 295, DIG. 17, 56/DIG. 20, 17.5, 503

(56) References Cited

U.S. PATENT DOCUMENTS

| | | |
|---|---|---|
| 2,697,323 A | 12/1954 | Horn |
| 2,786,318 A | 3/1957 | Caldwell, et al. |
| 2,857,729 A | 10/1958 | Zoldok |
| 2,924,059 A | 2/1960 | Beeston, Jr. |
| 3,162,990 A | 12/1964 | Cook |
| 3,320,733 A | 5/1967 | Kirk |
| 3,485,022 A | 12/1969 | Freedlander et al. |
| 3,538,692 A * | 11/1970 | Cope et al. ................ 56/295 |
| 3,717,985 A | 2/1973 | Freedlander et al. |
| 3,762,138 A | 10/1973 | Michael |
| 3,998,037 A | 12/1976 | Deans et al. |
| 4,079,578 A | 3/1978 | Cornellier |
| 4,149,358 A | 4/1979 | Comer |
| 4,269,020 A * | 5/1981 | Wolf ........................ 56/295 |
| 4,297,831 A * | 11/1981 | Pioch ....................... 56/295 |
| 4,318,268 A * | 3/1982 | Szymanis .................. 56/255 |
| 4,320,617 A | 3/1982 | Fedeli |
| 4,429,518 A | 2/1984 | Fedeli |
| 4,578,938 A | 4/1986 | Genesco |
| 4,715,173 A | 12/1987 | Anderson |
| 5,036,654 A | 8/1991 | Malutich |
| 5,056,605 A | 10/1991 | Bond et al. |
| 5,094,065 A | 3/1992 | Azbell |
| 5,167,109 A | 12/1992 | Meinerding |
| 5,291,725 A | 3/1994 | Meinerding |
| 5,473,873 A | 12/1995 | Sheldon |
| 5,515,670 A | 5/1996 | Meinerding |
| 5,581,987 A * | 12/1996 | Schuyler .................... 56/255 |
| 5,711,141 A * | 1/1998 | Pitman et al. .............. 56/255 |
| 6,050,634 A | 3/2000 | Larguier |

OTHER PUBLICATIONS

Rotary Corporation, Commercial Mulching Blade brochure—Admitted Prior Art, Glennville, Georgia–no date–.
Shredit Manufacturing Company, Don't Mulch It Shredit brochure—Admitted Prior Art, Canton, Ohio–no date–.
Silver Streak, Gator Mulcher Application Guide—Admitted Prior Art–no date–.

* cited by examiner

*Primary Examiner*—Robert E. Pezzuto
(74) *Attorney, Agent, or Firm*—Michael Best & Friedrich LLP

(57) ABSTRACT

A rotary lawn mower blade with improved combined mulching and shredding capability includes an outboard section having a leading cutting edge and a trailing edge. The trailing edge of the outboard section includes a plurality of teeth. The blade also includes a transition section having a leading cutting edge that is at least partially offset relative to the leading cutting edge of the outboard section. The transition section further includes a trailing edge having a partial tooth. Preferably, the plurality of teeth on the outboard section are twisted in either an inboard or an outboard direction. Additionally, the partial tooth can be twisted in an inboard direction. The blade also preferably includes a central mounting portion and an inboard section between the central mounting portion and the transition section. The inboard section also includes a leading cutting edge and a trailing edge.

20 Claims, 3 Drawing Sheets

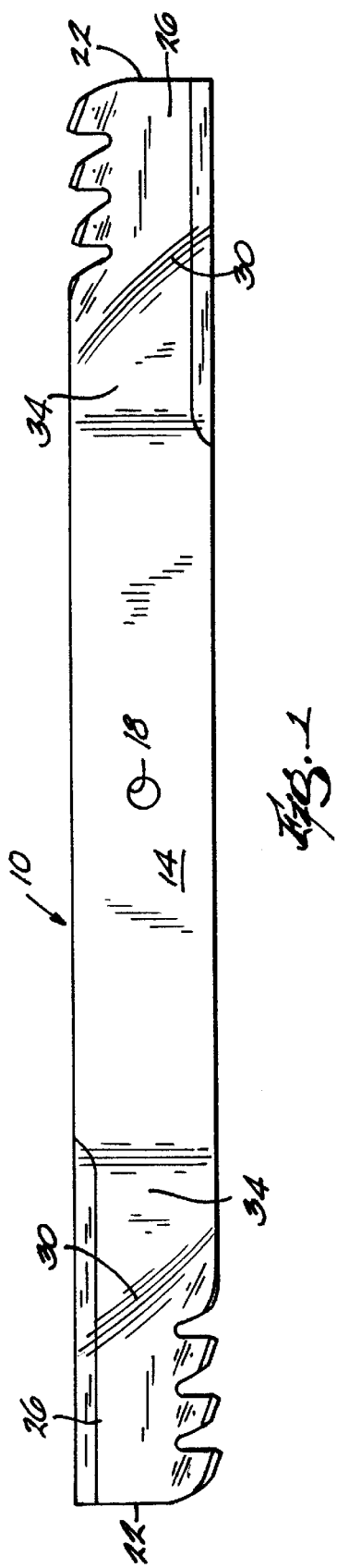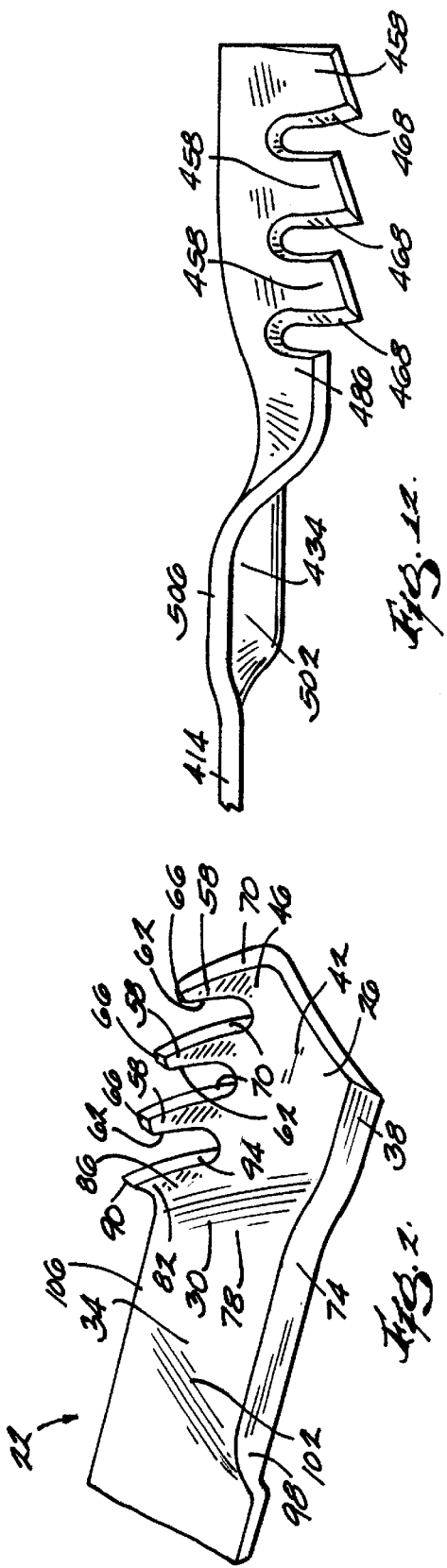

COMBINED MULCHING AND SHREDDING BLADE

RELATED APPLICATIONS

This application claims priority to U.S. Provisional Application Ser. No. 60/219,483 filed Jul. 20, 2000.

FIELD OF THE INVENTION

The invention relates to rotary lawn mower blades.

BACKGROUND OF THE INVENTION

In recent years, it has become less acceptable for lawn mower operators to collect grass clippings, leaves, and other yard debris for dumping in landfills or disposing via other public disposal means. In many regions, regulations prohibit the deposition of yard waste in landfills.

Lawn mower operators have been forced to simply cut their lawn and leave the clippings, chopped leaves, and other yard debris on the lawn. In an effort to minimize the presence of unsightly grass clippings and other unattractive debris on freshly cut lawns, blade manufacturers have developed specialized lawn mower blades. Mulching blades have been developed to mulch the grass into fine clippings that fall to the lawn and settle down out of sight. Shredding blades have been developed to shred leaves, twigs, and other yard waste into small particles that can also settle down in the grass.

SUMMARY OF THE INVENTION

The prior art mulching and shredding blades have various problems. Perhaps the largest problem is the inability of mulching blades to adequately shred leaves or yard debris on the lawn, and the inability of shredding blades to mulch the grass underlying the leaves and yard debris. Typically, mulching blades are designed specifically to mulch grass and have only incidental shredding capability. Likewise, shredding blades are designed specifically to shred leaves or debris and have poor grass mulching capability.

Mulching blades require the deck to be closed to keep large grass particles contained until cut into finer pieces. As long as the grass is not too long or the layer of leaves is not too thick, the blade lifts, cuts, mulches, distributes and hides the finely cut grass particles within the cut lawn. In the typical fall scenario, however, the long grass combined with a normal layer of fallen leaves and debris will overload the blade and detract from its capability to cut the grass, the leaves, and the debris into small particles.

Shredding blades are typically used with discharging mower decks. The blade is suited to break up dry, brittle leaves and twigs and discharge them as fine particles. Unfortunately, the features necessary to properly shred the leaves and debris are not well-suited for cutting long grass into fine particles. Grass that is cut by the shredding blade simply gets discharged onto the top of the lawn with the shredded leaf particles. Long grass clippings that are not brittle enough to be shredded often form a bridge between shredders and impede further shredding action.

In light of these problems, the lawn mower operator must decide which blade is best suited to handle the current yard conditions and then use either a mulching blade or a shredding blade to do the job. Depending on the choice made, the lawn will often have improperly shredded leaves and debris, improperly cut grass, or a combination of both. A more precise lawn mower operator may mow the lawn twice, first using a shredding blade on a raised setting to shred the leaves and debris, and then using a mulching blade on a lowered setting to cut the underlying grass. While yielding a better looking end result, this second option more than doubles the time needed to do the job, especially when considering the time required to change the blades.

The present invention solves the above-mentioned problems by providing an improved blade having combined shredding and mulching features. The single blade effectively mulches grass and shreds leaves and debris, allowing the operator to achieve a finely manicured lawn in a single pass. No time is spent deciding on which blade to use or changing blades to suit the condition of the yard. Furthermore, there is no need to undertake separate shredding and mulching passes.

The blade of the present invention can operate with a closed deck to lift and cut grass, comminute grass, lift and shred leaves and distribute finely cut particles into the lawn. Mulching under typical conditions throughout the mowing season is not compromised and mulching in somewhat taller or somewhat wetter conditions is improved. The blade can also be used with a conventional discharge deck to cut grass, partially mulch grass, shred leaves and discharge without compromising the shredding action under typical conditions.

More specifically, the invention provides a rotary lawn mower blade with improved combined mulching and shredding capability. The blade includes an outboard section having a leading cutting edge and a trailing edge. The trailing edge of the outboard section includes a plurality of teeth. The blade also includes a transition section having a leading cutting edge that is at least partially offset relative to the leading cutting edge of the outboard section. The transition section further includes a trailing edge having a partial tooth.

Preferably, the plurality of teeth on the outboard section are twisted in either an inboard or an outboard direction. Additionally, the partial tooth can be twisted in an inboard direction. The plurality of teeth and the partial tooth can each be sharpened or unsharpened.

The blade also preferably includes a central mounting portion and an inboard section between the central mounting portion and the transition section. The inboard section also includes a leading cutting edge and a trailing edge.

Other features and advantages of the invention will become apparent to those skilled in the art upon review of the following detailed description, claims, and drawings.

BRIEF DESCRIPTION OF THE DRAWINGS

FIG. 1 is a top view of a lawn mower blade embodying the invention.

FIG. 2 is a perspective view of one end of the blade of FIG. 1.

FIG. 12 is rear view taken along line 12—12 in FIG. 11.

Figure 3:
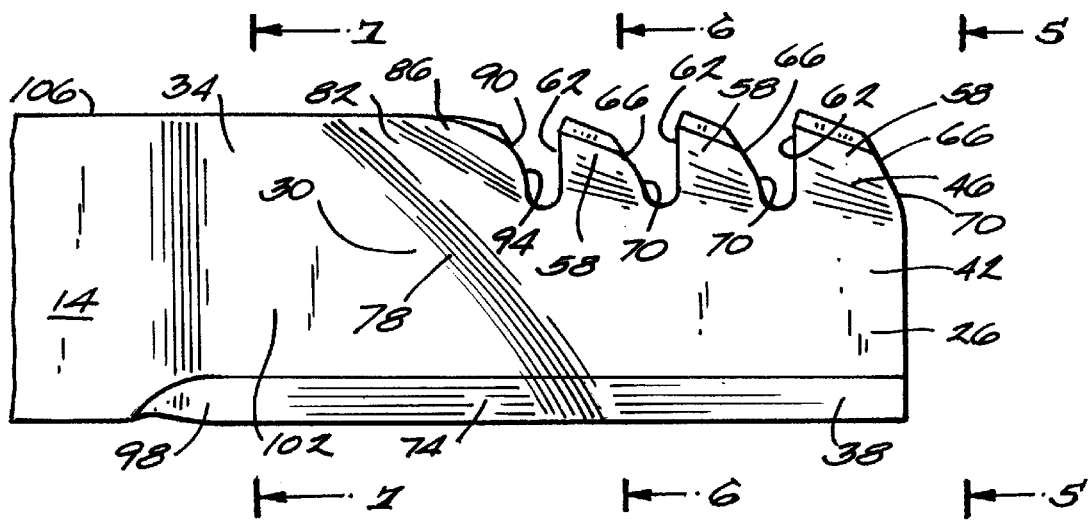
FIG. 3 is an enlarged top view of one end of the blade of FIG. 1.
Figure 4:
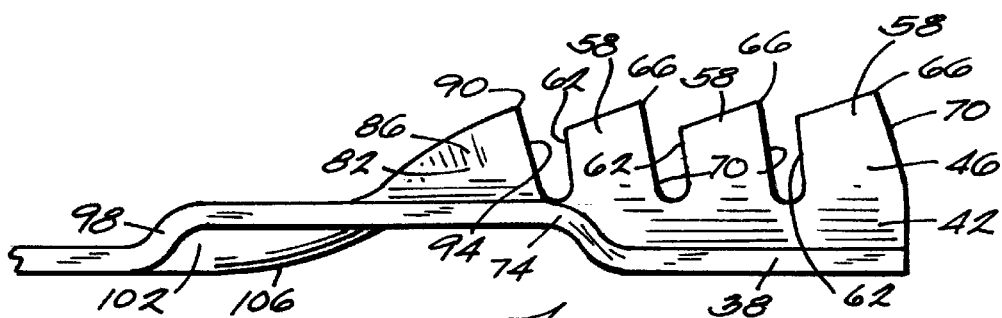
FIG. 4 is an enlarged front view of one end of the blade of FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIGS. 1–7 illustrate a preferred embodiment of the invention. Referring to FIG. 1, a rotary lawn mower blade 10 has a central mounting portion 14 including a central bore 18 for attaching the blade 10 to a motor shaft (not shown). The blade 10 also includes opposing ends 22. Since the ends 22 of the blade 10 are preferably mirror images of one another, only one end (see FIGS. 2–4) will be described in detail. Like reference numeral indicate like parts. As illustrated in FIGS. 1–7, the blade end 22 is preferably composed of at least three sections, an outboard section 26, a transition section 30, and an inboard section 34. As best seen in FIGS. 2–5, the outboard section 26 includes a leading cutting edge 38, a rearward span of material 42 that is formed slightly upward and a trailing edge or portion 46 formed further upward.

As shown in the figures, the leading cutting edge 38 is preferably sharpened to a thirty-degree bevel on the top, or mower side of the blade 10, however, the blade 10 can also have the cutting edge 38 beveled on the bottom, or grass side of the blade 10. Additionally, the leading cutting edge 38 can be manufactured by beveling both the mower side and the grass side of the blade 10. The bevel need not be thirty degrees, but rather can be any suitable angle.

The leading cutting edge 38 can be forged, coined, sheared, machined or formed via any other suitable operation. It should also be noted that the leading cutting edge 38 need not be sharpened at all, and instead can simply be the natural edge of the blade 10 material. This could be a round or square mill edge, a sheared edge with the break on the top or the bottom, a sheared edge further conditioned by working it into a round or nearly round edge or a machined round or square edge.

In addition, the leading cutting edge 38 can include a series of notches or serrations (not shown). While the blade 10 can be made of steel or any other suitable material, MARBAIN is preferred when the leading cutting edge 38 includes notches or serrations to substantially prevent the notch or serration design from becoming a detrimental stress concentrator. MARBAIN is also a preferred material when the leading cutting edge 38 is not notched or serrated. The leading cutting edge 38 can be protected from wear or made to wear in a beneficial manner by the selective application of any suitable treatments.

Figure 5:
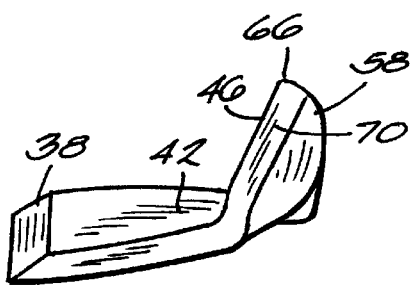
FIG. 5 is an end view taken along line 5—5 in FIG. 3.
Figure 6:
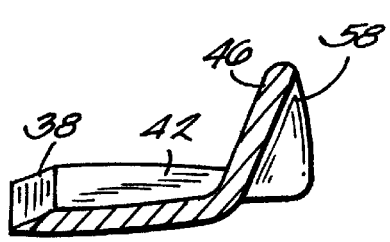
FIG. 6 is a section view taken along line 6—6 in FIG. 3.

As best shown in FIG. 5, the rearward span of material 42 slopes upward from the leading cutting edge 38 to the trailing portion 46. Preferably the rearward span of material 42 is curved upwardly and includes a relatively large concave radius in the top surface of the rearward span 42. The radius can range from approximately three to six inches, with the most preferred radius being approximately four-and-one-half inches. The upward slope of the rearward span 42 helps create a low pressure area during cutting that tends to keep the grass clippings, leaves, debris, etc. up near the rotating blade 10 for repeated cutting.

The trailing edge 46 includes a plurality of teeth or tabs 58 that function to shred grass clippings, leaves, twigs and other debris (not shown). In addition, the upward slope of the teeth 58 help create the area of low pressure that tends to keep the clippings and leaves up near the rotating blade 10. The teeth 58 are formed by first forming notches 62 in the trailing edge 46. There are preferably three notches 62 formed to yield three individual teeth 58. Of course, fewer or more notches 62 could be formed to yield fewer or more teeth 58. The width, depth and orientation of the notch can be varied to optimize comminuting for any particular tooth geometry. In the preferred embodiment, the three notches 62 are each approximately 0.25 inches wide by 0.625 inches long and are oriented substantially normal to the trailing edge 46.

As best shown in FIGS. 2–6, the outboard corners 66 of the teeth 58 are bent inboard toward the inboard section 34 and forward toward the leading cutting edge 38 to achieve an inboard-twist orientation. The inboard-twist is preferably the same for each of the teeth 58 and begins on a line defined by the base of each notch 62. In the embodiment shown in FIGS. 1–7, the outboard or cutting edge 70 of each tooth 58 is sharpened for improved mulching and shredding capability. The teeth 58 can be sharpened in any suitable manner as described above with respect to the leading cutting edge 38.

The transition section 30 includes a leading cutting edge 74, a rearward span of material 78, and a formed up trailing edge 82. The leading cutting edge 74 transitions to be offset upwardly relative to the leading edge 38 of the outboard section 26. In the preferred embodiment, the leading cutting edge 74 of the transition section 30 transitions to be offset approximately one-half inch higher than the leading cutting edge 38 of the outboard section 26. Larger and smaller offsets are also contemplated. The leading cutting edge 74 can be formed as described above with respect to the leading cutting edge 38 of the outboard section 26.

The rearward span of material 78 between the offset leading cutting edge 74 and the formed up trailing edge 82 is contoured to accommodate the offset between the respective leading cutting edges 38 and 74. As best seen in FIGS. 2 and 3, the rearward span 78 transitions between the upwardly curved rearward span 42 to become substantially flat with a downward slope toward the trailing edge 82. This downward slope preferably includes a concave radius in the bottom surface of the rearward span of material 78. The radius can range from approximately three to six inches, with the most preferred radius being approximately four-and-one-half inches. Alternatively, the rearward span 78 can be substantially parallel to the central mounting portion 14 or can be twisted slightly upward to resemble the rearward span 42.

The trailing edge 82 of the transition section 30 preferably includes one partial tooth 86. The outboard corner 90 of the partial tooth 86 is bent inboard and forward like the outboard corners 66 of the teeth 58 to yield a fourth cutting edge 94. Like the cutting edges 70, the cutting edge 94 is preferably sharpened for improved mulching and shredding capability. The inboard-twist orientation of the partial tooth 86 is substantially the same as the inboard-twist orientation of the teeth 58. The cutting edge 94 of the partial tooth 86 preferably begins just inboard of the offset portion of the leading cutting edge 74, and the partial tooth 86 blends into the inboard section 34 of the blade 10.

As best seen in FIGS. 2–4, and 7, the inboard section 34 is comprised of a leading cutting edge 98, a rearward span of material 102, and a trailing edge 106.

The leading cutting edge 98 begins offset, like the offset portion of the leading cutting edge 74, and then transitions downwardly to the central mounting portion 14 of the blade 10. The leading cutting edge 98 can be formed as described above with respect to the leading cutting edge 38 of the outboard section 26 and the leading cutting edge 74 of the transition section 30.

Figure 7:
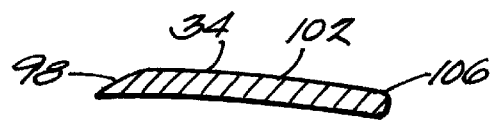
FIG. 7 is a section view taken along line 7—7 in FIG. 3.

As best shown in FIG. 7, the rearward span of material 102 preferably slopes downwardly from the offset portion of the leading cutting edge 98 to the trailing edge 106. This downward slope preferably includes a concave radius in the bottom surface of the rearward span of material 102. The radius can range from approximately seven to ten inches, with the most preferred radius being approximately 8.57 inches.

The trailing edge 106 of the inboard section 34 transitions between the partial tooth 86 and the central mounting portion 14. The portion of the trailing edge 106 adjacent the partial tooth 86 is curved slightly upward due to the inboard-twist of the partial tooth 86. As the trailing edge 106 continues inboard, it blends with the downward slope of the rearward span 102 and finally blends into the central mounting portion 14 of the blade 10.

The features described above with respect to the first preferred embodiment of the blade 10 work together to provide a blade 10 with a combined mulching and shredding capability. It should be noted that the features described above can be varied to optimize the combined mulching and shredding capability for specific cutting applications and to work in conjunction with different mounting and deck configurations. Additionally, while the teeth 58 and the partial tooth 86 are shown in the figures as being integral with the blade 10, they could also be attached to the blade 10 in any suitable manner. Furthermore, the features described above could be incorporated on one end of a "half-blade" configuration (i.e., a flail blade or a rotary cutter) wherein the blade mounts to the motor shaft at one end and the mulching or shredding operations are performed by the other end of the blade.

Figure 10:
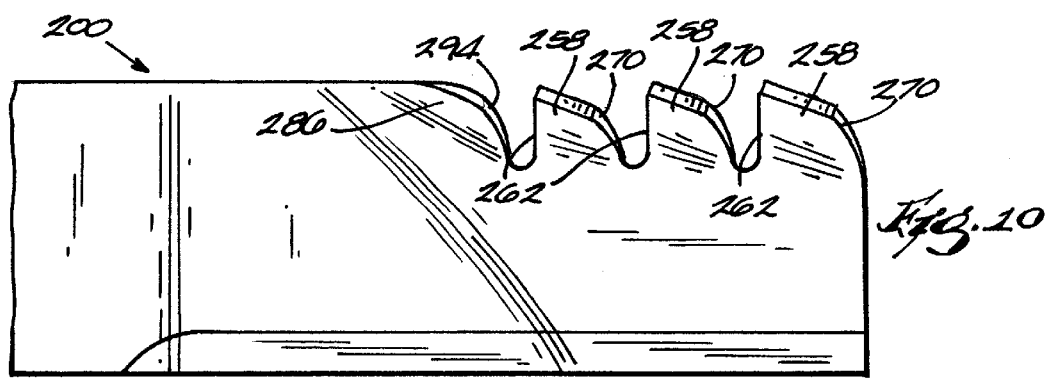
FIG. 10 is an enlarged top view of another alternative embodiment of the invention.

FIG. 10 illustrates a portion of a blade 200 that is a second preferred embodiment of the invention. The blade 200 is substantially identical to the blade 10, with the exception that the outboard or cutting edges 270 of the teeth 258 and the outboard or cutting edge 294 of the partial tooth 286 are unsharpened. The cutting edge 294 and the two most inboard cutting edges 270 can be left in their natural state subsequent to the formation of the notches 262. The outboard-most cutting edge 270 can be left in the natural state of the blade material as described above.

Figure 8:
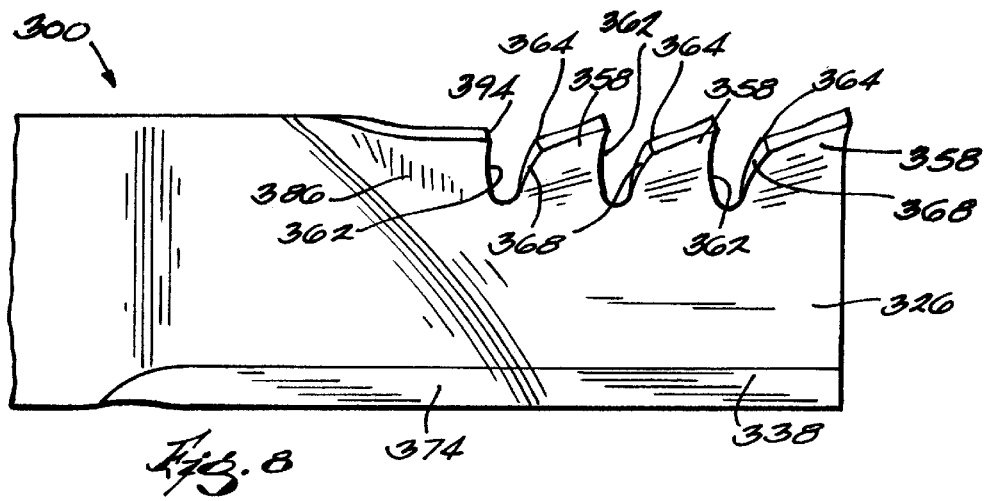
FIG. 8 is an enlarged top view of an alternative embodiment of the invention.
Figure 9:
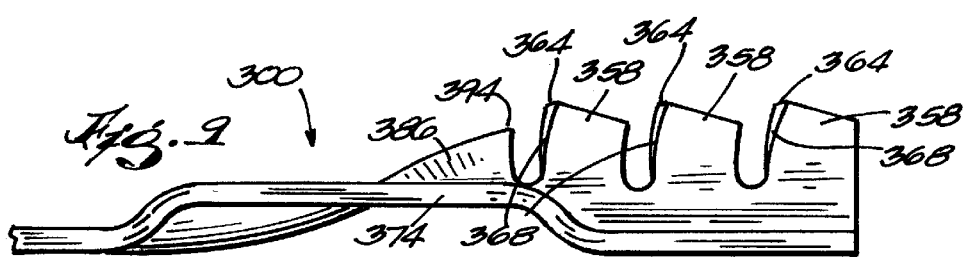
FIG. 9 is an enlarged front view of the blade of FIG. 8.

FIGS. 8 and 9 illustrate a portion of a blade 300 that is a third preferred embodiment of the invention. The blade 300 is similar to the blades 10 and 200, but the orientation of the teeth 358 and the configuration of the partial tooth 386 are different. The teeth 358 of the blade 300 have an outboard-twist orientation resulting from bending the inboard corners 364 of the teeth 358 outboard toward the outboard section 326 and forward toward the leading cutting edge 338. The outboard-twist is preferably the same for each of the teeth 358 and begins on a line defined by the base of each notch 362. The inboard or cutting edge 368 of each tooth 358 is left in its natural state subsequent to the formation of the notches 362.

The partial tooth 386 does not have the same outboard-twist orientation as the teeth 358. Rather, the outboard corner 394 of the partial tooth 386 is simply bent forward toward the leading cutting edge 374, and is therefore formed up with little or no twist. The partial tooth 386 is formed up to a lesser extent than the teeth 358. Forming up the partial tooth 386 aids in creating the low pressure needed to keep the clippings up near the blade 300 during operation.

Figure 11:
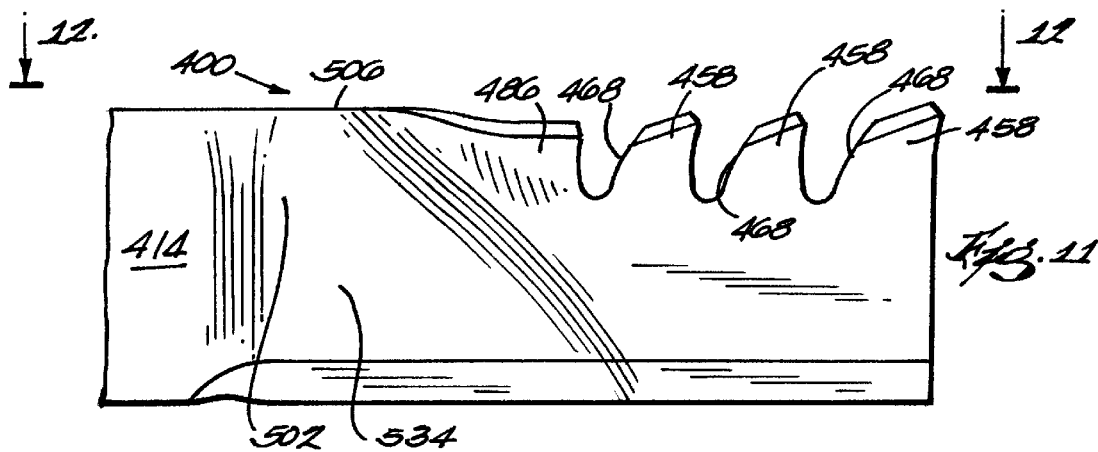
FIG. 11 is an enlarged top view of yet another alternative embodiment of the invention.

FIGS. 11 and 12 illustrate a portion of a blade 400 that is a fourth preferred embodiment of the invention. The blade 400 is substantially identical to the blade 300, with the exception that the inboard or cutting edges 468 of the teeth 458 are sharpened. The teeth 458 can be sharpened in any suitable manner as described above with respect to the leading cutting edge 38.

FIG. 12 also illustrates a subtle variation to the inboard section 434. The trailing edge 506 of the inboard section 434 transitions between the partial tooth 486 and the central mounting portion 414, but unlike the blades 10 and 200, the trailing edge 506 dips below the level of the generally planar central mounting portion 414 before transitioning back up to the level of the central mounting portion 414. This variation can improve the air flow and pressure pattern needed to keep the particles up near the rotating blade 400, and can also be used in conjunction with any of the other blades 10, 200, and 300.

The blades of all of the embodiments can be formed via any suitable operation including being forged, coined, sheared, stamped, machined, or any combination thereof.

Various features of the invention are set forth in the following claims.

What is claimed is:

1. A rotary lawn mower blade comprising:
   an outboard section including:
      a leading cutting edge that defines a first circumferential cutting path, and
      a trailing edge within the first circumferential cutting path, the trailing edge including a plurality of teeth; and
   a transition section including:
      a leading cutting edge that is at least partially offset vertically relative to the leading cutting edge of the outboard section, the leading cutting edge of the transition section defining a second circumferential cutting path, and
      a trailing edge within the second circumferential cutting path and including at least a partial tooth.

2. The rotary lawn mower blade of claim 1, wherein the plurality of teeth on the outboard section are twisted inboard.

3. The rotary lawn mower blade of claim 2, wherein the plurality of teeth on the outboard section are sharpened.

4. The rotary lawn mower blade of claim 1, wherein the plurality of teeth on the outboard section are twisted outboard.

5. The rotary lawn mower blade of claim 4, wherein the plurality of teeth on the outboard section are sharpened.

6. The rotary lawn mower blade of claim 1, wherein the partial tooth on the transition section is twisted inboard.

7. The rotary lawn mower blade of claim 6, wherein the partial tooth on the transition section is sharpened.

8. The rotary lawn mower blade of claim 1, wherein the partial tooth on the transition section is bent toward the leading cutting edge of the transition section.

9. The rotary lawn mower blade of claim 1, wherein the outboard section is curved upwardly from the leading cutting edge to the trailing edge.

10. The rotary lawn mower blade of claim 9, wherein the outboard section has a top surface with a radius of curvature of approximately 4.5 inches.

11. The rotary lawn mower blade of claim 1, wherein the transition section is at least partially curved downwardly from the leading cutting edge to the trailing edge.

12. The rotary lawn mower blade of claim 11, wherein the transition section has a bottom surface with a radius of curvature of approximately 4.5 inches.

13. The rotary lawn mower blade of claim 1, further including a central mounting portion and an inboard section between the central mounting portion and the transition section, the inboard section having a leading cutting edge and a trailing edge.

14. The rotary lawn mower blade of claim 13, wherein the inboard section is at least partially curved downwardly from the leading cutting edge to the trailing edge.

15. The rotary lawn mower blade of claim 14, wherein the inboard section has a bottom surface with a radius of curvature of approximately 8.57 inches.

16. A rotary lawn mower blade having improved mulching and shredding capabilities, the blade comprising:
    an outboard section including:
        a leading cutting edge that defines a first circumferential cutting path, and
        a trailing edge within the first circumferential cutting path, the trailing edge including a plurality of teeth and wherein the outboard section is curved upwardly from the leading cutting edge to the trailing edge;
    a transition section including:
        a leading cutting edge that is at least partially offset vertically relative to the leading cutting edge of the outboard section, the leading cutting edge of the transition section defining a second circumferential cutting path, and
        a trailing edge within the second circumferential cutting path and including at least a partial tooth, the transition section being at least partially curved downwardly from the leading cutting edge to the trailing edge;
    a central mounting portion; and
    an inboard section between the central mounting portion and the transition section, the inboard section having a leading cutting edge and a trailing edge, the inboard section being at least partially curved downwardly from the leading cutting edge to the trailing edge.

17. The rotary lawn mower blade of claim 16, wherein the outboard section has a top surface with a radius of curvature between approximately 3 and 6 inches.

18. The rotary lawn mower blade of claim 16, wherein the transition section has a bottom surface with a radius of curvature between approximately 3 and 6 inches.

19. The rotary lawn mower blade of claim 16, wherein the inboard section has a bottom surface with a radius of curvature between approximately 7 and 10 inches.

20. The rotary lawn mower blade of claim 16, wherein the blade is made from MARBAIN.

* * * * *

UNITED STATES PATENT AND TRADEMARK OFFICE
CERTIFICATE OF CORRECTION

PATENT NO. : 6,487,840 B1
DATED : December 3, 2002
INVENTOR(S) : Darrel L. Turner and Richard L. Wilkey It is certified that error appears in the above-identified patent and that said Letters Patent is hereby corrected as shown below:

<u>Title page,</u>
Item [56], References Cited, U.S. PATENT DOCUMENTS, delete "6,050,634 3/2000 Larguier" and insert in its place -- 6,040,634 3/2000 Larguier --.

Signed and Sealed this

Seventeenth Day of June, 2003

JAMES E. ROGAN
*Director of the United States Patent and Trademark Office*